United States Patent [19]
Llewellyn et al.

[11] Patent Number: 4,637,413
[45] Date of Patent: Jan. 20, 1987

[54] DEGREASING APPARATUS

[75] Inventors: Michael Llewellyn, Watsall; Stephen Holden, Telford, both of England

[73] Assignee: Safety-Kleen Corporation, Elgin, Ill.

[21] Appl. No.: 628,828

[22] Filed: Jul. 9, 1984

[51] Int. Cl.⁴ .............................................. B08B 3/02
[52] U.S. Cl. .................................... 134/111; 134/172; 134/174
[58] Field of Search ............... 134/104, 109, 110, 111, 134/118, 172, 174; 220/88 R, 89 B

[56] References Cited

U.S. PATENT DOCUMENTS

| | | | |
|---|---|---|---|
| 1,421,979 | 7/1922 | Mitchell | 220/88 R |
| 1,745,466 | 2/1930 | Anschicks | 68/209 X |
| 2,573,008 | 10/1951 | Gorden | 134/111 |
| 2,577,372 | 12/1951 | Smith | 220/89 B X |
| 2,646,585 | 7/1953 | Whittington | 134/111 X |
| 3,276,459 | 10/1966 | Harrison | 134/111 X |
| 3,352,310 | 11/1967 | Doyscher | 134/111 X |
| 3,378,019 | 4/1968 | Riolo et al. | 134/111 |
| 3,416,544 | 12/1968 | Paiva | 134/111 X |
| 4,051,858 | 10/1977 | Mele | 134/111 X |
| 4,052,227 | 10/1977 | Delo et al. | 134/111 X |
| 4,226,548 | 10/1980 | Reith | 134/111 X |

Primary Examiner—Harvey C. Hornsby
Assistant Examiner—Frankie L. Stinson
Attorney, Agent, or Firm—James T. FitzGibbon; Angelo J. Bufalino

[57] ABSTRACT

A low profile parts washer with a central solvent storage well, a pair of side walls subdivided into upper and lower portions, intermediate wall supporting wheels with the wheel axle lined above the well bottom, a safety cover positioned by a pair of supports and held above the well by fusible link means, a solvent pump and motor and a parts retainer screen covering the opening formed by the intermediate walls and the center solvent well.

6 Claims, 2 Drawing Figures

DEGREASING APPARATUS

The present invention relates to degreasing apparatus.

In the garage trade it is frequently necessary to clean parts during maintenance and servicing in order to remove dust, dirt, grease, etc. For example, the cleaning of brake drums is a particular problem where asbestos dust from the linings must be dampened and grease and oil removed. There is a requirement for a machine which can be used to clean components before or at the time of dismantling, i.e. in a position at or adjacent the area of the vehicle which is being worked on.

According to the present invention there is provided degreasing apparatus comprising an open top tank mounted on wheels and having a well serving as a reservoir for degreasing fluid, a pump which circulates fluid from the tank to a distributing nozzle by way of a flexible pipe for directing fluid onto the components to be cleaned and the tank being adapted to be used to catch the cleaning fluid draining from the components being cleaned.

The apparatus according to the invention has the advantage that it is of low overall height, which enables it to be positioned beneath the components being cleaned, making cleaning possible.

Conveniently, the well accommodating the cleaning fluid is disposed between the wheels, with the wheels secured to lateral side extensions from the well. A rim is formed around the lateral side extensions so as to define an open top catch tank which has a larger open area than the well. A mesh screen is disposed in the top catch tank to catch non-soluble items. Any parts removed may be located on the mesh for cleaning purposes. The mesh also prevents accidentally dislodged parts or dropped tools from falling into the well.

The mesh carries a safety plate which is secured thereto by solder bolts. The safety plate is provided with two lateral side flanges which are dimensioned to fit within the lateral side walls of the well and which are provided with apertures which allow fluid to flow from the catch tank, as defined by the lateral side extensions, into the well. In the event of a fire breaking out, the connection at the solder bolts breaks, due to the solder melting, whereupon the safety plate is released from the mesh and falls into a position which effectively closed the top of the well from atmosphere, thus excluding further ingress of air.

Conveniently, the nozzle incorporates a brush and the pump is disposed in the well at one end thereof and separated from the catch tank by a filter in the form of a mesh screen.

The invention will now be described further, by way of example only, with reference to the accompanying drawings, in which.

Figure 1:
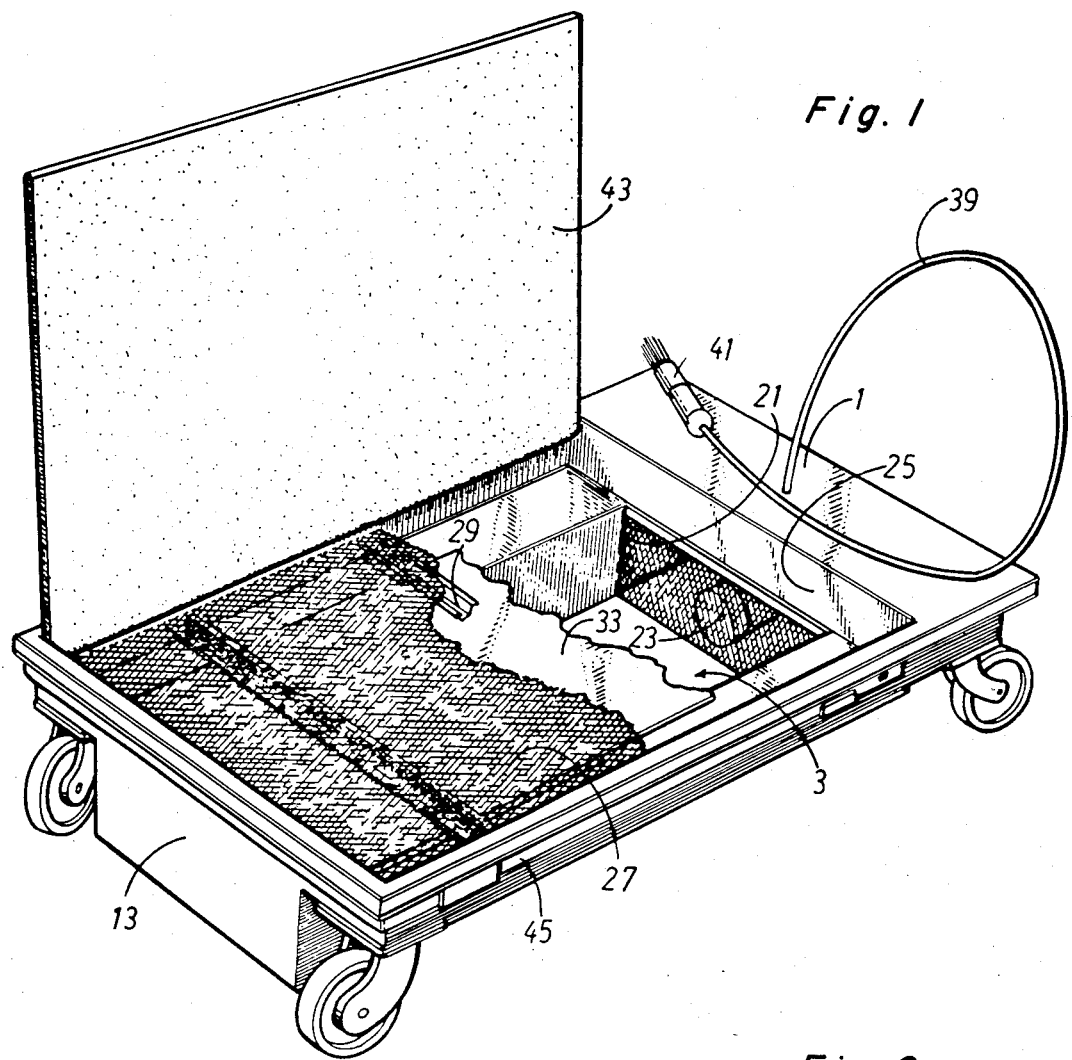
FIG. 1 is a perspective view of one embodiment of the invention.
Figure 2:
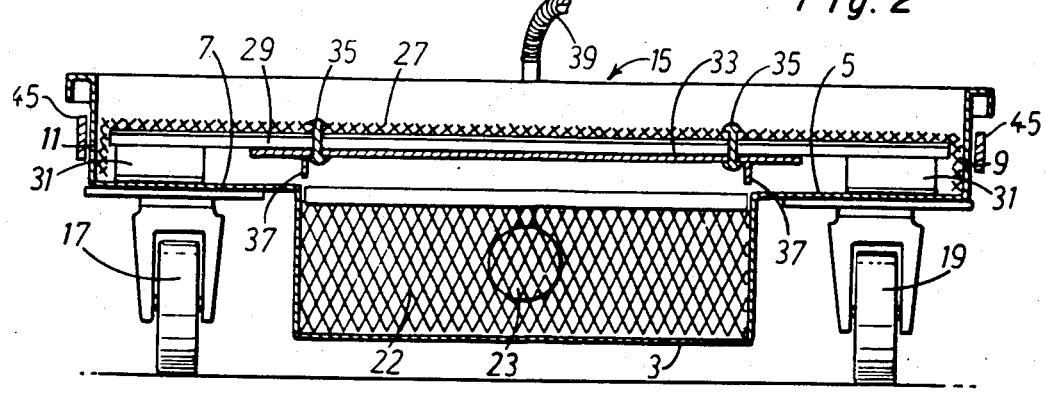
FIG. 2 is a transverse sectional view of the embodiment of FIG. 1.

Referring to the drawings, the apparatus comprises a tank 1 which is generally T-shaped in cross-section, having a central well 3, and on each lateral side of the well at the open top thereof, a respective lateral extension 5, 7 with upturned flange portions 9, 11. The opposite ends of the tank are formed by T-shaped plates 13. An open top catch tank 15 is defined by the well and the lateral side extensions. The catch tank has an open area which is larger than that of the well. The side extensions 5, 7 have mounted thereon a respective pair of wheels 17, 19 by means of which the apparatus is rendered mobile. The well 3 sits between the pairs of wheels. The wheels 19 are provided with brakes.

A channel 21 is formed on the sides of the well towards one end thereof to receive a filter plate in the form of a mesh and to define a portion partitioned from the main part of the well to receive a pump 23. The pump may be driven from an electric motor or from an air motor. An air line or wires, as the case may be, lead to the motor from suitable switching means positioned externally of the tank. A cover 25 is provided to close off the top of the catch tank or well over the pump. The output from the pump feeds by way of a flexible pipe 39 to a nozzle 41 provided with a brush.

A mesh screen 27 is disposed within the open catch tank and is supported by means of brackets 29 and feet 31 at a distance from the lateral side extensions 5, 7. A safety plate 33 is secured to the brackets 29 by solder bolts 35. The safety plate is slightly larger in width than the width of the well and carries two downwardly extending flanges 37 which are positioned inwardly of the lateral sides of the well. The flanges are perforated to allow fluid to flow into the well from the open catch tank and from the side extensions.

In the event of a fire, the solder melts so that the safety plate drops downwardly effectively closing off the top of the well from atmosphere and thereby suffocating any fire within. A neoprene cover 43 is provided and is conveniently secured to the tank by a holding bar secured to the front of it. The tank is preferably made from 16 gauge steel sheet. The overall height of the apparatus is approximately nine inches (23 cm).

A U-shaped handle 45 is secured to the outside vertical walls (flange portions 9, 11) and is arranged to be slidable and pivotable so that it can be slidably withdrawn to extend from the end 13 and then pivoted upwardly at an angle of approximately 60° whereupon it abuts the turned area top flange of the catch tank. The handle enables the machine to be easily maneuvered.

In use, the apparatus is wheeled into a position beneath the components to be cleaned, for example brake drums and other brake or suspension parts, and cleaning fluid dispensed by way of the nozzle onto the parts to be cleaned. The fluid draining from the parts is caught in the catch tank and drains into the well where it is filtered and recirculated to the nozzle.

In the form shown, the horizontal walls or lateral extensions 7 are shown as extending outwardly on two sides only, but it will be understood that such extensions could also be provided on one or two additional sides, particularly if it is desirfed to have the outer margins of the safety cover overlie horizontal surfaces completely surrounding the center well 3.

It will thus be seen that the present invention provides a novel parts washer unit having a number of advantages and characteristics, including those herein specifically pointed out and others which are inherent in the invention.

A preferred embodiment of the invention having been shown by way of example, it is anticipated that other variations to the described form of apparatus and method may be made without departing from the spirit of the invention or the scope of the appended claims.

We claim:

1. A parts washer apparatus adapted for reception beneath an automobile or like object to be repaired, said parts washer including a solvent collection and storage tank which includes a solvent storage well defined by plural side walls, at least two of which are disposed opposite each other and are subdivided into upper and lower side wall portions, with said upper and lower portions being joined to each other by a generally horizontally extending intermediate wall portions, with the top edges of all of said side walls being joined to each other to provide a top opening of a given area larger than the area of said storage well, at least two pairs of support spacers resting upon said intermediate wall portions, safety cover supports extending between pairs of spacers, said supports extending across the open portion of said storage well, a fire safety cover suspended from said cover supports in generally overlying relation to said storage well and having outer margins overlying said intermediate wall portions and a center panel portion overlying the opening of said storage well, fusible means suspending said cover from said cover support and retaining said cover in vertically spaced apart relation to said center well and said intermediate wall portions, a plurality of wheel assemblies extending downwardly from spaced apart portions of the underside of said intermediate wall portions of said collection and storage tank, whereby the rotational axes of said wheel portions of said wheel assemblies may lie above the bottom surface of said storage well, a pump and conduit assembly forming a part of said parts washer and disposed with said pump inlet within said solvent storage well and said pump outlet communicating with a flexible conduit having an outlet end positionable above said collection and storage tank opening, and a screen disposed above said cover support for retaining parts to be cleaned and permitting solvent return to said well through said screen.

2. A parts washer unit as defined in claim 1 which further includes a cover hingedly mounted to said collection and storage tank and adapted to cover said tank in the closed position of said cover to prevent evaporative loss of solvent.

3. A parts washer as defined in claim 1 wherein said wheel assemblies comprise four wheels, each having its own wheel support.

4. A parts washer as defined in claim 1 wherein said fire safety cover further includes means disposed on a lower surface thereof which are adapted to register with side wall portions of said storage well in order to facilitate alignment and registry of said fire safety cover with the open portion of said well.

5. A parts washer as defined in claim 1 wherein said pump comprises a submersible pump and motor assembly disposed in one end of said solvent storage well.

6. A parts washer as defined in claim 1 wherein said pump is disposed in said storage well and wherein one end of said storage receptacle is screened off with a filter to protect said recirculating pump.

* * * * *